(12) United States Patent
Drexler

(10) Patent No.: US 10,960,993 B2
(45) Date of Patent: Mar. 30, 2021

(54) SPACECRAFT-MODULE HABITATS AND BASES

(71) Applicant: Jerome Drexler, Los Altos Hills, CA (US)

(72) Inventor: Jerome Drexler, Los Altos Hills, CA (US)

(*) Notice: Subject to any disclaimer, the term of this patent is extended or adjusted under 35 U.S.C. 154(b) by 358 days.

(21) Appl. No.: 16/175,587

(22) Filed: Oct. 30, 2018

(65) Prior Publication Data

US 2020/0130871 A1    Apr. 30, 2020

(51) Int. Cl.
| | |
|---|---|
| *B64G 1/42* | (2006.01) |
| *B64G 1/46* | (2006.01) |
| *B64G 1/10* | (2006.01) |
| *G21B 1/19* | (2006.01) |
| *B64G 1/62* | (2006.01) |
| *B64G 99/00* | (2009.01) |
| *B64G 1/40* | (2006.01) |

(Continued)

(52) U.S. Cl.
CPC .............. *B64G 1/422* (2013.01); *B64G 1/105* (2013.01); *B64G 1/408* (2013.01); *B64G 1/46* (2013.01); *B64G 1/62* (2013.01); *B64G 9/00* (2013.01); *G21B 1/19* (2013.01); *B64G 1/002* (2013.01); *B64G 5/00* (2013.01); *B64G 2001/1071* (2013.01)

(58) Field of Classification Search
CPC .......... B64G 1/422; B64G 1/62; B64G 1/408; B64G 1/10546; B64G 9/00
See application file for complete search history.

(56) References Cited

U.S. PATENT DOCUMENTS

| | | |
|---|---|---|
| 9,068,562 B1 | 6/2015 | Budica |
| 10,384,813 B2 * | 8/2019 | Drexler ................ B64G 1/62 |
| 2006/0126771 A1 | 6/2006 | Da Conceicao |

(Continued)

FOREIGN PATENT DOCUMENTS

| | | |
|---|---|---|
| CA | 2153406 A1 | 7/1994 |
| JP | H08211190 A | 8/1996 |

(Continued)

OTHER PUBLICATIONS

Aguilar et al., "Precision Measurement of the Proton Flux in Primary Cosmic Rays from Rigidity 1 GV to 1.8 TV with the Alpha Magnetic Spectrometer on the International Space Station", Physical Review Letters, PRL 114, 171103, May 1, 2015, 9 pages.

(Continued)

*Primary Examiner* — Jessica B Wong
(74) *Attorney, Agent, or Firm* — Thomas Schneck; Mark Protsik

(57) ABSTRACT

Establishing and growth of a lunar or planetary surface base involves continuing to use landing spacecraft as docked modules of the base for habitation and work. A first spacecraft is landed at a specified surface site then doubles as first module of the base. A second (and later third and subsequent) spacecraft is landed at the site a safe distance from the existing base modules then moved over the surface into a side-by-side position to dock with selected base modules. At least some of the landing, surface transport, and operational electric power is supplied by micro-fusion using ambient cosmic rays and muons interacting with deuterium-containing particle fuel material to generate energetic reaction products.

21 Claims, 6 Drawing Sheets

(51) Int. Cl.
*B64G 1/00* (2006.01)
*B64G 5/00* (2006.01)

(56) References Cited

U.S. PATENT DOCUMENTS

| | | | |
|---|---|---|---|
| 2008/0123793 | A1 | 5/2008 | Loan et al. |
| 2009/0000268 | A1 | 1/2009 | Yurash |
| 2015/0098543 | A1 | 4/2015 | Cohen |
| 2018/0033496 | A1 | 2/2018 | Sedwick |

FOREIGN PATENT DOCUMENTS

| | | | |
|---|---|---|---|
| WO | WO9013125 | A1 | 11/1990 |
| WO | WO9222909 | A1 | 12/1992 |
| WO | WO2014114986 | A1 | 7/2014 |

OTHER PUBLICATIONS

Alvarez et al., "The Catalysis of Nuclear Reactions by mu Mesons", Lawrence Berkeley National Laboratory, Dec. 10, 1956, 5 pages.

Nakamura et al. (revised by Beatty et al.), "Cosmic Rays", JP G 37, 075021, Feb. 16, 2012, 21 pages.

Hassler et al., "Mars' Surface Radiation Environment Measured with the Mars Science Laboratory's Curiosity Rover", Science, Nov. 12, 2013, 35 pages.

Jackson, "A Personal Adventure in Muon-Catalyzed Fusion", Physics in Perspective 12, 2010, pp. 74-88.

Jackson, "Muon Catalysis of Fusion: A Commentary", Lawrence Berkeley Laboratory, Physics Division, Aug. 1984, 12 pages.

Kaye & Laby, NPL, "Cosmic Rays", 4 pages, http://www.kayelaby.npl.co.uk/general_physics/2_7/2_7_7.html.

Kaye & Laby, NPL, "Nuclear Fusion", 9 pages, http://www.kayelaby.npl.co.uk/atomic_and_nuclear_physics/4_7/4_7_4.html.

Cucinotta et al., "Space Radiation Cancer Risk Projections and Uncertainties—2012", NASA/TP-2013-217375, Jan. 2013, chapter 2—pp. 9-41.

Nuclear Power, "Photoneutrons", Nov. 3, 2015, 3 pages, https://www.nuclear-power.net/nuclear-power/fission/delayed-neutrons/photoneutrons/>.

U.C. Berkeley Physics 250, "Cosmic Rays", Neutrino/Nuclear Astrophysics, Spring 2011, Class Notes, Chapter 9, pp. 1-36, available from Univ. of Washington, www.int.washington.edu/PHYS554/2011/chapter9_11.pdf.

Beals et al., "Project Longshot: An Unmanned Probe to Alpha Centauri", U.S. Naval Academy, Report for 1987-1988, 74 pages.

J.J. Hopkins Laboratory for Pure and Applied Science, General Atomic division of General Dynamics, "Nuclear Pulse Space Vehicle Study", Chapter 2, Sep. 19, 1964, 30 pages.

Martin et al., "Project Daedalus: The Propulsion System—Part 1: Theoretical Considerations and Calculations", 1978, scan copy, 49 pages.

Schmidt et al., "Nuclear Pulse Propulsion—Orion and Beyond", 36th AIAA/ASME/SAE/ASEE Joint Propulsion Conference & Exhibit, Jul. 16-19, 2000, https://ntrs.nasa.gov/archive/nasa/casi.ntrs.nasa.gov/20000096503.pdf>.

SpaceX, "First-stage landing—Onboard camera", YouTube, May 27, 2016, 1 page, https://youtu.be/4jEz03Z8azc>.

J. Crusan, "Habitation Module", National Aeronautics and Space Administration, Nasa Advisory Council, Jul. 26, 2016.

Wikipedia—Mars Direct.

Wikipedia—Mars Habitat.

Wikipedia—Austere Human Missions to Mars.

Wikipedia—Mars Design Reference Mission.

Wikipedia—NASA Design Reference Mission 3.0.

\* cited by examiner

SPACECRAFT-MODULE HABITATS AND BASES

TECHNICAL FIELD

The present invention relates to establishing, growth and maintenance of bases or colonies on lunar and planetary surfaces, such as on the Moon and on Mars. The invention also relates to inducement of controlled muon-catalyzed nuclear micro-fusion and particle-target micro-fusion both to generate thrust-producing micro-fusion products and for electric power generation.

BACKGROUND ART

To establish a permanent presence on the Moon or on Mars, one needs livable habitats, a sustainable supply of food and clean water, sanitation, electric power, communication equipment, medical facilities, and the like. For example, one might set a goal to have an ongoing population level at a lunar or Martian surface base of about 50-100 people. Initially, one might allow for recurring resupply of necessary materials from Earth, but ultimately a stable base or colony would need to be largely self-sustainable with only occasional supply of otherwise unattainable materials.

There are clear differences between conditions on Earth and those on Mars. The extreme cold on Mars is roughly to Antarctica, but an extremely low atmospheric pressure on Mars means there is need for a pressure suit to survive outdoors. Additionally, the Martian atmosphere's composition is an unbreathable mix of about 95% $CO_2$, less than 5% inert gases (mainly $N_2$ and Ar), and essentially no $O_2$. Mars' lack of a magnetosphere means that cosmic rays and solar particles easily reach the surface. Despite the low atmospheric pressure, the dry surface conditions still allow dust storms to occasionally block solar power and/or communications. One-way communication delays from 3 to 22 minutes between Mars and Earth mean that real-time conversations are impossible, and some time-critical decisions will need to be made independently of Earth. Also, direct communication with Earth is periodically blocked around the superior conjunction with the Sun for about 2 weeks or up to a month.

Numerous proposals for building a permanent human presence on either the Moon or on Mars have been made. For example, Mars Direct was a proposal made in 1990 by Robert Zubrin and David Baker of Martin Marietta. Among its many features was a multi-deck descent vehicle forming a Mars Habitat Unit, which is separate from an Earth Return Vehicle that would remain in Mars orbit. The Mars Habitat Unit would include individual sleeping quarters, a communal living area, hygiene facilities, exercise area, galley, storage space, and laboratory areas for scientific research. Airlocks would allow the crew to go out to the Mars surface after suiting-up in pressure suits. A dedicated radiation shelter in the Mars Habitat Unit's core would protect the crew during solar events.

Modifications of this proposal include various versions of NASA's Mars Design Reference Mission (DRM) from 1993 to present (now on version 5.0). A feature of DRM is that two Mars Habitat Units, one flown to Mars unmanned then later a second one with crew, would allow a dedicated laboratory facility in one unit connected to the living quarters in a second unit, plus a large rover vehicle for extra-habitat operations. The two units would be positioned alongside one another and docked together. Efforts to control costs have led to a NASA "Austere Human Missions to Mars" proposal with independent ascent vehicle and surface stay habitats. Space habitat module competitive development design processes, such as NASA's NextSTEP-2 habitation systems have resulted in several proposals, including an Inflatable Lunar Habitat by Bigelow Aerospace that maximizes usable interior volume.

SpaceX has active development for their Big Falcon Rocket (BFR) and spaceship (BFS) for eventually setting up of a human-occupied base on the Mars surface. The second stage BFS, as currently announced, is 55 m long, 9 m in diameter, and 85 t empty mass with 1000 $m^3$ of pressurized cargo volume and capabilities for 100 t payload (50 t return payload). Most of the vehicle's 1335 t of gross mass is for 1100 t of chemical propellant.

Muon-catalyzed fusion was observed by chance in late 1956 by Luis Alvarez and colleagues during evaluation of liquid-hydrogen bubble chamber images as part of accelerator-based particle decay studies. These were rare proton-deuteron fusion events that only occurred because of the natural presence of a tiny amount of deuterium (about one part per 6400) in the liquid hydrogen. It was quickly recognized that fusion many orders of magnitude larger would occur with either pure deuterium or a deuterium-tritium mixture. However, John D. Jackson (Lawrence Berkeley Laboratory and Prof. Emeritus of Physics, Univ. of California, Berkeley) correctly noted that for useful power production there would need to be an energetically cheap way of producing muons. The energy expense of generating muons artificially in particle accelerators combined with their short lifetimes has limited its viability as an earth-based fusion source, since it falls short of break-even potential.

Another controlled fusion technique is particle-target fusion which comes from accelerating a particle to sufficient energy to overcome the Coulomb barrier and interact with target nuclei. To date, proposals in this area depend upon using some kind of particle accelerator. Although some fusion events can be observed with as little as 10 KeV acceleration, fusion cross-sections are sufficiently low that accelerator-based particle-target fusion are inefficient and fall short of break-even potential.

It is known that cosmic rays are abundant in interplanetary space. Cosmic rays are mainly high-energy protons (with some high-energy helium nuclei as well) with kinetic energies in excess of 300 MeV. Most cosmic rays have GeV energy levels, although some extremely energetic ones can exceed $10^{18}$ eV. FIG. 8 shows cosmic ray flux distribution at the Earth's surface after significant absorption by Earth's atmosphere. In near-Earth space, the alpha magnetic spectrometer (AMS-02) instrument aboard the International Space Station since 2011 has recorded an average of 45 million fast cosmic ray particles daily (approx. 500 per second within that instrument's effective acceptance area and measurement energy range). The overall flux of galactic cosmic ray protons (above Earth's atmosphere) can range from a minimum of 1200 $m^{-2}s^{-1}sr^{-1}$ to as much as twice that amount. (The flux of galactic cosmic rays entering our solar system, while generally steady, has been observed to vary by a factor of about 2 over an 11-year cycle according to the magnetic strength of the heliosphere.) In regions that are outside of Earth's protective magnetic field (e.g. in interplanetary space), the cosmic ray flux is expected to be several orders of magnitude greater. As measured by the Martian Radiation Experiment (MARIE) aboard the Mars Odyssey spacecraft, average in-orbit cosmic ray doses were about 400-500 mSv per year, which is an order of magnitude higher than on Earth.

Cosmic rays are known to generate abundant muons from the decay of cosmic rays passing through Earth's atmosphere. Cosmic rays lose energy upon collisions with atmospheric dust, and to a lesser extent atoms or molecules, generating elementary particles, including pions and then muons, usually within a penetration distance of a few cm. Typically, hundreds of muons are generated per cosmic ray particle from successive collisions. Near sea level on Earth, the flux of muons generated by the cosmic rays' interaction by the atmosphere averages about 70 $m^{-2}s^{-1}sr^{-1}$. The muon flux is even higher in the upper atmosphere. These relatively low flux levels on Earth reflect the fact that both Earth's atmosphere and geomagnetic field substantially shields our planet from cosmic ray radiation. Mars is a different story, having very little atmosphere (only 0.6% of Earth's pressure) and no magnetic field, so that muon generation at Mars' surface is expected to be very much higher than on Earth's surface.

SUMMARY DISCLOSURE

A method of establishing and growing a lunar or planetary surface base is provided which makes use of the presence of ambient flux of cosmic rays. A series of spacecraft are landed at a specified site on a lunar or planetary surface. The spacecraft are not only designed to transport people to the lunar or planetary surface (e.g. the surface of Mars). They have modular features, so one doesn't throw the several spacecrafts away or reserve them only for departures. Instead they are designed with features to facilitate later conversion from a crew/cargo transport spacecraft into specialized uses on the lunar or planetary surface. In particular, "base-like" spacecraft can double as habitat and workspace modules, wherein the spacecraft are linked together to form habitats, research facilities, one or more communications centers, and other needed or useful functions to support a lunar or planetary surface base.

Using Mars as an example, one sends a first craft (e.g. with equipment) to Mars. This first spacecraft lands at a specified site on the Martian surface. This craft will subsequently double as a first module of the Martian surface base. Then one sends a second spacecraft to Mars (e.g. with crew). It lands at the specified site at a safe distance nearby the first module (e.g. within one kilometer). Using electric-powered ground transport methods, this second craft is moved into side-by-side position with the first craft/module and then docked with that first module. The second spacecraft, now connected to the first module, doubles as a second module of the Martian surface base. In the same way, third and subsequent craft (e.g. transporting additional cargo or even colonists) are landed at the specified site at a safe distance nearby the existing surface base, then moved into side-by-side position and docked with at least one existing module of the surface base.

The modular system is connected so that crew and colonists don't have to put on a spacesuit and leave the facility every time they wish to visit another module. Rather, they can move from module to module through the docking system that links the several modules together. Each new arriving spacecraft adds functionality, as well as both living space and workspace, as it lands and is connected to the existing base structure, thereby creating extra structure. Not all craft are necessarily completely full. An early number of cargo-only spacecraft pre-arrive at the selected site, then crew flights begin that work to assemble the key base components before later-arriving colonists.

At least one of the landings and moving of the several arriving spacecrafts, as well as the operation of the converted surface modules, are powered by interaction of an ambient flux of cosmic rays and muons generated from those cosmic rays with a localized cloud of deuterium-containing particle fuel material exposed to those cosmic rays and muons to produce energetic micro-fusion reaction products. The use of cosmic-ray and muon catalyzed micro-fusion reduces the weight and volume needed for fuel (~40% reduction). The savings allow design of the spacecraft to be upgraded relative to comparable chemical fuel only craft to provide significantly more habitat/work space accommodations and facilities both during flight and later at the destination on lunar or Martian surface. The same advantage applies not only to the Earth-Mars transport spacecraft that will double as the base modules. Use of micro-fusion allows less weight and volume to be needed for producing landing thrust. Alternatively, the landing spacecraft can now be of significantly larger size.

Once on the lunar or planetary surface, electric power can, at least partially, be achieved using micro-fusion electric generators that replace or supplement solar power. Particularly for Mars, where solar output may be substantially diminished by Martian dust storms, micro-fusion works under both dusty (many muons) and non-dusty (direct cosmic ray) conditions.

DETAILED DESCRIPTION

Figure 1:
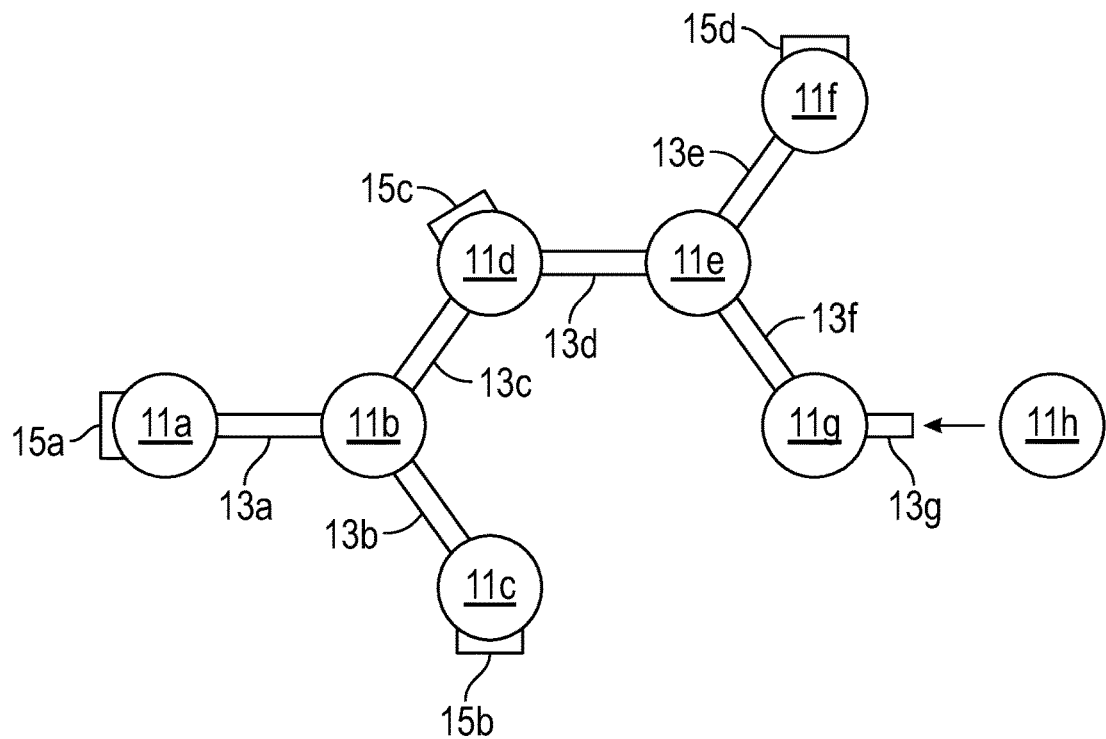
FIG. 1 is a top plan schematic of a set of surface base modules interconnected with one another via docking systems and with one or more exterior airlock systems. A new module is in process of being transported into position.
Figure 2:
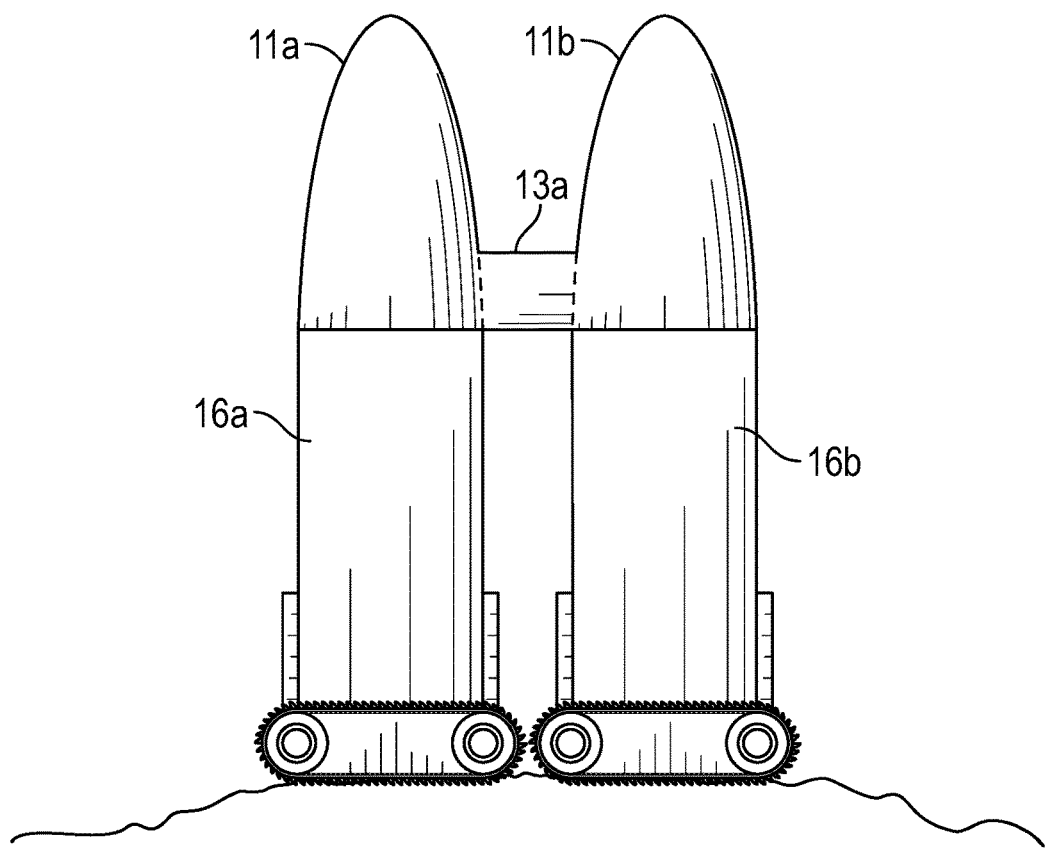
FIG. 2 is a schematic side view of two docked surface base modules.

With reference to FIG. 1, a set of surface base modules (here seven in number) 11a-11g are interconnected with one another via respective docking systems 13a-13f. A new module 11h is in process of being transported into position to connect to existing module 11g by means of docking system 13g. One or more exterior airlock systems 15a-15d are provided from some of the modules to allow access to the lunar or planetary (e.g. Martian) surface. As seen in FIG. 2, two of the modules (e.g. modules 11a and 11b) are connected by docking system 13a. Modules 11a and 11b are both derived from the original spacecraft that have landed on the surface, and now double as usable modules of the surface base. At least part of the former micro-fusion fuel spaces 16a and 16b might now be used as storage facilities in the modules. It should be noted that one of the modules (perhaps one that is not docked with the other modules) might be retained as an ascent vehicle for reaching an Earth-return vehicle in orbit.

Figure 3:
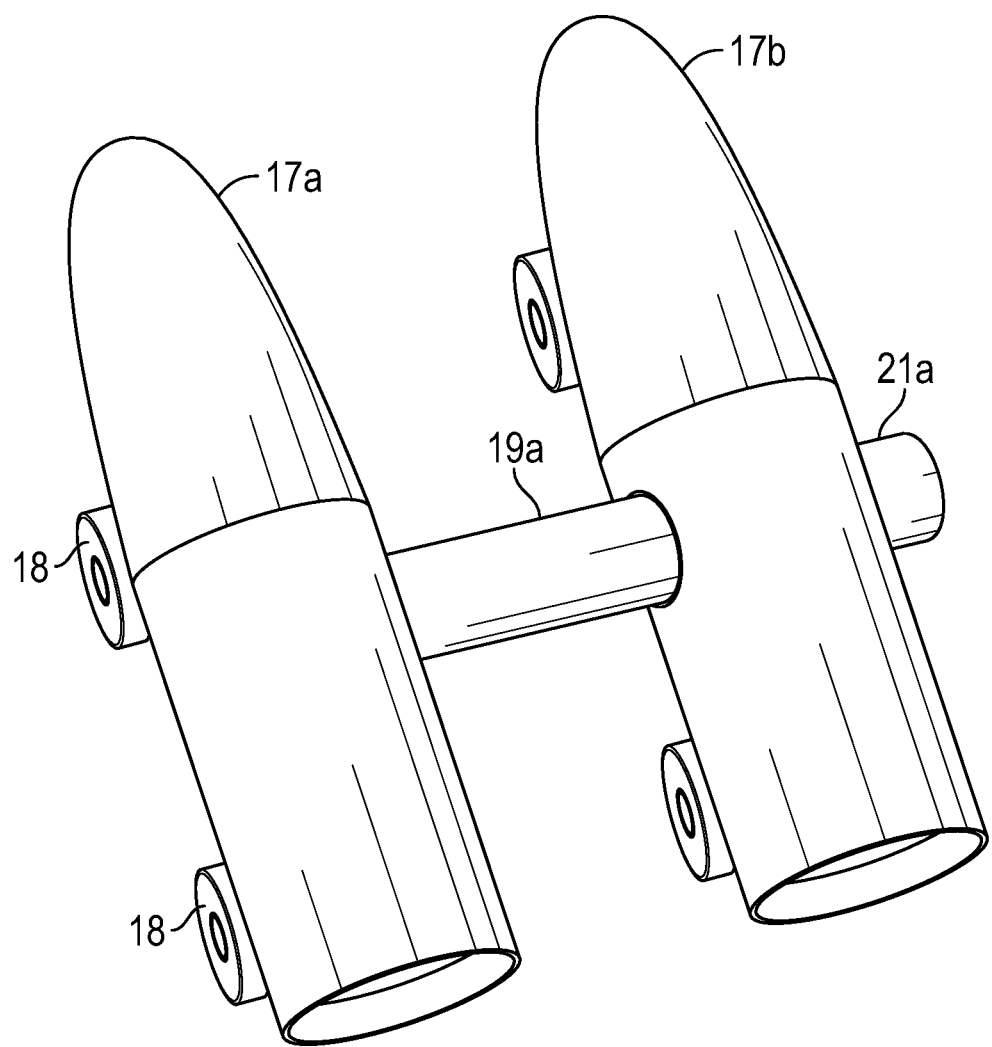
FIG. 3 is a schematic perspective view from above of an alternative configuration of two docked surface base modules spacecraft landed (or turned onto) their sides, rather than the upright configuration of FIG. 2.

As seen in FIG. 3, an alternative configuration provides for spacecraft 17a, 17b, etc. having landed or being turned onto their sides to serve as surface base modules. Wheels 18, with or without tracks, may be employed to aid moving of the two craft into side-by-side position for docking. A typical spacecraft might have a length of about 50 meters and a diameter of about 10 meters. Two such spacecraft 17a and 17b are connected by a docking unit 19a. Spacecraft 17b has an exterior airlock system 21a for passage outside the base to the lunar or planetary surface. For ease of assembling the modular base, a vertical spacecraft position (as in FIG. 2) is favored, especially when the spacecraft lands in that vertical position. However, for best utilization by humans of the interior volume of a base module a horizontal position is favored. For that purpose, the spacecraft might either land in that horizontal position (upon wheels) or land vertically and then be turned (lowered) onto its horizontal resting position. In either case, a surface base could have a variety of possible configurations with some spacecraft/modules being oriented in an upright vertical orientation and others in a horizontal orientation.

The modules 11a-11h serve as inhabited environment for such domains as the lunar and Martian surfaces to create surface bases for human exploration and colonization. Initially, most of the supporting infrastructure will be obtained from Earth. First, one will want to demonstrate the viability by means of a base on Moon, with extended mission durations and perhaps permanent human occupation. Eventually, a similar setup would be established on the Martian surface, again with initial supporting infrastructure obtained from Earth.

The various modules 11a-11h of the base should meet the needs of astronauts beyond minimum survival. Improved living conditions and quality of life allow for both physical and psychological wellness. One or more of the modules would be provided with communication equipment to allow regular contact, not only with an Earth command base, but also with family, friends and professional colleagues on Earth to relieve some of the psychological stress associated with inherent physical isolation. Astronauts will be confined within limited and largely unchanging physical spaces and must live for extended durations in close-quarters with others. A variety of social relationships and role assignments, with possible multiple overlapping responsibilities for each astronaut might lead to interpersonal tensions that need to be planned for and mitigated. However, the use of micro-fusion as a fuel and energy source will allow larger volumes of usable space that can accommodate recreational facilities and create opportunities for personal privacy.

The base is established using multiple modules with largely proven technology and stocked with necessary equipment. When the spacecraft are being designed and built for space missions, their conversion into the various modules upon arrival would be anticipated and certain special reconstruction-related features would be included to facilitate that conversion. Each of the modules is launched separately, then assembled afterward upon arrival at the lunar or planetary surface. The base grows by adding additional modules. The base layout can be planned well in advance, and the various individual spacecraft would be assigned to specific module positions at the base. There can be separate cargo and crew ships. One could pre-position cargo on the surface before crew flights. One or more of the earliest modules in the base can be assembled robotically, employing automated surface transport of the modules into their desired positions and automated docking of the respective modules. Once enough modules have been linked together to form a minimal base with the essential functional components, later craft can be sent with a crew (and eventually, colonists). There will be several crew-only flights to assemble and get a base operational and work out any problems, well before any paying passengers or space tourists are sent to such a base.

Essentially, one uses spacecraft themselves as the base modules, only reserving a small number as ascent vehicles for return trips to orbit. Consecutive crews land prefab habitat modules in the same location and link them together to form a base using the spacecraft components to serve as the base modules. If desired, one could also use local resources to manufacture structural components made from surface regolith (refine and/or sinter) and harvest surface water ice to absorb harmful radiation. A double-wall structure filled with water built around an inflatable interior structure has previously been proposed (inflatable structures tend to maximize the available interior volume available as working and living space and allow room for easier movement). However, at least initially, the spacecraft themselves would double as habitat modules. But the base has the potential for self-expansion and self-sustenance, with a design life cycles of decades and capability for repairs and upgrades as needed.

The modules 11a-11h provide a closed pressurized interior ecosystem with always pressurized interior passage between modules via the docking tunnels 13a-13g and with airlock systems 15a-15d to the exterior. The life support systems need to sustain human life on Mars during long-term (multi-year) missions and even permanently. It is known, for example, that the Sabatier reaction ($4H_2 + CO_2 \rightarrow CH_4 + 2H_2O$) using a catalyst and supplied hydrogen can generate water from carbon dioxide (obtained from Mars' atmosphere). The water can be used to generate oxygen (and hydrogen) via electrolysis. Alternatively, water ice from Mars can be used to extract the oxygen. Reusable $CO_2$ scrubbers can vent scrubbed $CO_2$ (from human respiration) into the atmosphere to keep $CO_2$ concentrations at nontoxic levels. Although the levels of inert gases in the Mars atmosphere are low (approx. equal levels of $N_2$ and Ar), there is still enough available to enrich the interior base environment (via cryogenic extraction) to 40% $N_2$, 40% Ar, 20% 02 mixture, so that a very flammable 100% oxygen condition can be avoided. The modules would also preferably employ low emission materials to keep the breathable environment free from contamination.

One or more of the modules 11a-11h might be dedicated to living plants or other biologicals to supplement the air and (nutritional) food supply. However, this requires that relevant plants survive. At least initially, fertilizers and organic material (e.g. manure and compost) will need to be added to Lunar or Martian regolith to sustain conditions for growth. With enough $N_2$ in the breathable air, nitrogen fixing bacteria could supplement plant nutrition. For example, some modules from spacecraft landed (or turned) on their sides (approx. 50 m long by 10 m diameter) could contain two stories of greenhouses within (each about 3-4 m high, plus 1-2 m of ceiling space for pipes, cables and storage). These two-story greenhouses would have artificial lighting simulating a solar spectrum (fluorescent or LED grow lights) and powered by micro-fusion electric generators.

A kitchen or galley may be provided in one or more of the modules, using both dehydrated (or sealed) rations resupplies from Earth and relatively fresh food grown in the agricultural module(s). There should be food choices for both adequate nutrition as well as a personalized menu that reflects cultural differences among the crew and colonists.

Naturally, at least one module will contain living and sleeping quarters. Individual habitation quarters with adequate privacy are desirable. An exercise area or gymnasium with fitness equipment that provides for physical exercise and recreational activities should be included. A library with adequate digital content (literature, music, besides technical info) should also be included.

Still other modules are needed for sanitation/hygiene facilities, including toilets and showers. Both long-wear clothing and laundry facilities are needed. Waste management and water reclamation and purification facilities are also needed. Spent packaging and trash disposal should be kept to a minimum, with materials being designed for potential reuse or re-purposing.

At least one of the modules 11a-11h should provide a medical center for emergency medical care and even minor surgery, to treat a wide range of health issues. Maintaining crew health is paramount for successful base operations. Multiple certified doctors, paramedics, and nurses among the crew and colonists (with adequate redundancy) must be able to treat cases such broken legs, open wounds and appendicitis, to prevent minor injuries from becoming life threatening. Ophthalmology and dental are needed. Training to deal with space-specific health problems (radiation, loss of pressure, are also required. It is to be remembered that one-way transit times on the order of six to nine months between Mars and Earth mean that patient transport back to an Earth hospital is generally impractical except for more chronic health cases. Thus, this module would include all needed diagnostics and treatment equipment and supplies, including pharmaceuticals. Radiation monitoring/dosimetry and mitigation will likely also be needed.

One or more modules should have a safety refuge in case of emergencies, whether an external solar radiation event, a fire in the base, or loss of pressure in one portion of the base. Shielding to protect from solar and cosmic radiation, perhaps in a core area of each module can prevent or minimize exposure. One would need to be able monitor solar activity to give adequate advance warning. For fire safety, heat and smoke detection units and fire suppression and cleanup equipment should be included in the various modules. Likewise, the docking systems 13a-13g between the individual modules 11a-11h should automatically seal if a loss of pressure is sensed in an adjacent module.

Many of the modules will be used as communal workspaces, laboratories, and meeting places. Some of the modules will be used primarily as storage facilities, including food storage. Modules will have communication equipment for intra-base communication between modules, while at least one module will be dedicated to facilitating communication with orbiting equipment and with Earth.

The airlocks 15a-15d provide an opportunity to leave the base and explore the lunar or planetary surface. Pressure suits would be provided, as well as one or more rovers for surface transportation. Eventually, more extensive infrastructure construction, maintenance, and repair equipment, as well as resource extraction equipment (mining, moving, refining) for in-situ resource utilization would be added to the base.

Figure 4:
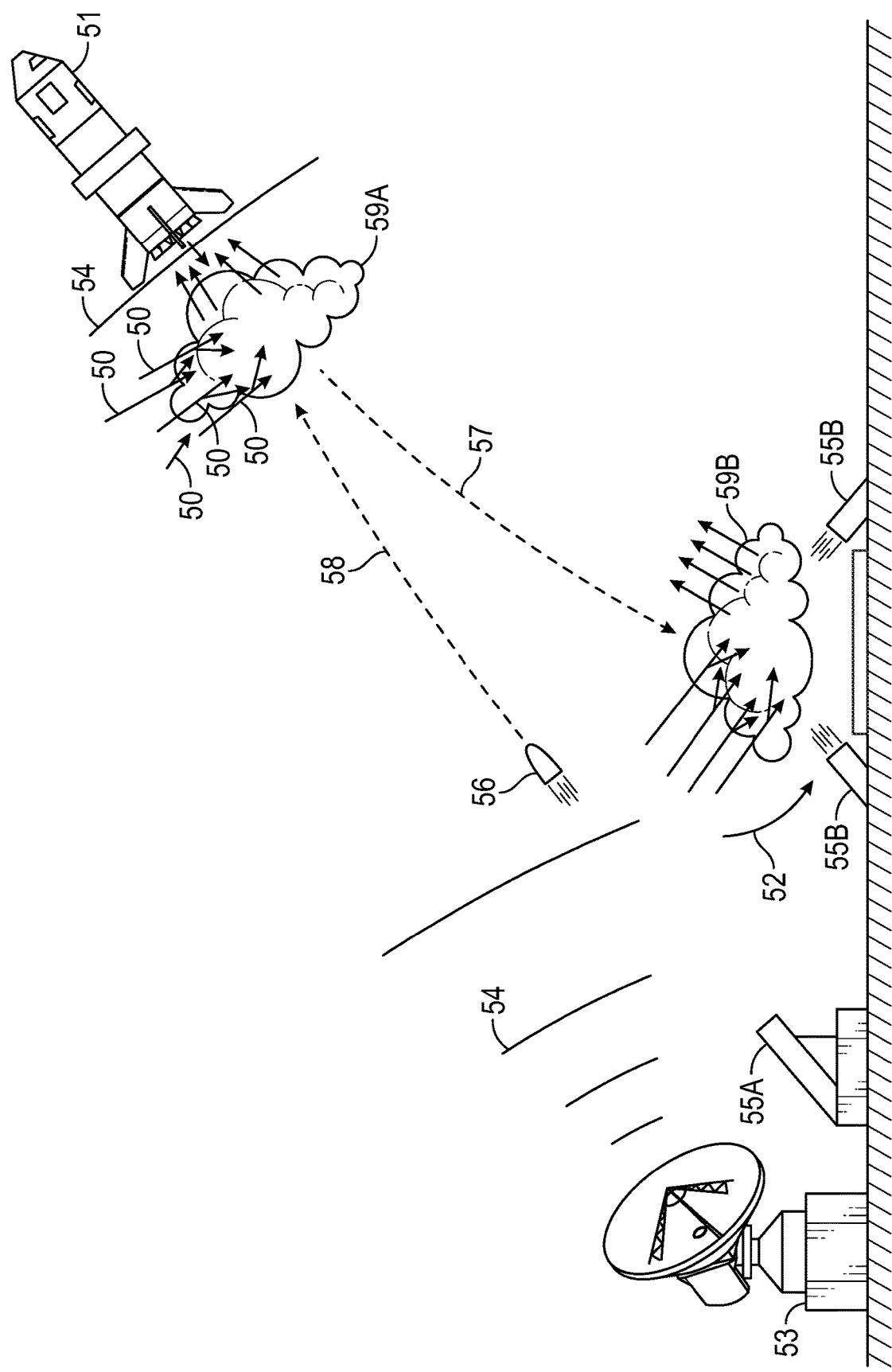
FIG. 4 is a schematic side view illustrating landing of an incoming spacecraft using cosmic-ray/muon-catalyzed micro-fusion propulsion for retro-thrust. In this representative embodiment pre-positioned equipment at a landing site guides and facilitates landing of the incoming craft.

The modules make use of micro-fusion in a variety of ways. One use is in facilitating the landing of craft nearby the existing base by means of micro-fusion retro-thrust as seen in FIG. 4. Micro-fusion engines are used for braking or decelerating spacecraft to an extent that facilitates a soft landing upon the surface of a planet (e.g. Mars), moon or other space body. In particular, a landing technology takes advantage of the abundance of cosmic rays available for free and the abundance of muons generated from such cosmic rays on or near planets, moons and other space bodies with weak (or no) magnetic field and a thin (or no) atmosphere to catalyze micro-fusion events sufficient to produce braking thrust to slow a craft in preparation for a successful landing on their surface. Because the ambient cosmic rays and muons are available here for free in much larger quantities than on Earth, they do not need to be generated artificially in an accelerator. Thus, the invention provides a basic tool using micro-fusion for missions beyond Earth-orbit, such as a mission to Mars. Since the amount of energy needed for thrust is generally much less than the multi-kiloton yields of atomic weapons, "micro-fusion" is the term used here to refer to fusion energy outputs of not more than 10 gigajoules per second (2.5 tons of TNT equivalent per second), to thereby exclude macro-fusion type explosions.

One way to achieve this decelerating or braking micro-fusion thrust is to disperse micro-fusion fuel target material (pellets, chips or powder) forward of the craft itself (or beneath for landing), which fuel material will then interact with the incoming flux of cosmic rays and muons, thereby producing a combination of particle-target micro-fusion and/or muon-catalyzed micro-fusion. The cosmic ray particle or muon triggered micro-fusion events create a high velocity wind of alpha particles (helium nuclei) as fusion reaction products. An external pusher configuration similar that proposed for Project Orion could be used to receive the thrust, except that here controlled micro-fusion events, not atomic explosions, are the source of that thrust.

The deuterium-containing "fuel" for the particle-target and/or muon-catalyzed micro-fusion may be supplied in the form of solid $Li^6D$ as chips, pellets or powder. Muon-created muonic deuterium and lithium-6 can come much closer to the nucleus of a neighboring atom with a probability of fusing the nuclei, releasing energy. Once a muonic molecule is formed, fusion proceeds extremely rapidly ($\sim 10^{-10}$ sec). One cosmic ray particle can generate hundreds of muons, and each muon can typically catalyze about 100 micro-fusion reactions before it decays (the exact number depending on the muon "sticking" cross-section to any helium fusion products). For example, a desired reaction is $Li^6 + D \rightarrow 2He^4 + 22.4$ MeV, where much of the useful excess energy is carried as kinetic energy of the two helium nuclei (alpha particles). Additionally, any remaining cosmic rays can themselves directly stimulate a micro-fusion event by particle-target fusion, wherein the high energy cosmic ray particles (mostly protons, but also helium nuclei) bombard relatively stationary target material. When bombarded directly with cosmic rays, the lithium-6 may be transmuted into tritium which could form the basis for some D-T micro-fusion reactions. Other forms of target fuel material might include heavy water ($D_2O$) or liquid deuterium ($D_2$) to produce D-D micro-fusion reactions.

The present invention achieves nuclear micro-fusion using deuterium-containing target material and the ambient flux of cosmic rays and generated muons that are already naturally present in the extraterrestrial environment at much higher concentrations than on Earth. The optimum concentration of the target material for the particle-target and muon-catalyzed micro-fusion may be determined experimentally based on the abundance of cosmic rays with a view to maintaining billions of micro-fusion events at a rate adequate for generating the desired braking thrust, while avoiding any possibility of a runaway macro-fusion event. Assuming most of the energy can be captured and made available for thrust or electrical generation, an estimated $10^{15}$ individual micro-fusion reactions (less than 1 µg of fuel consumed) per second would be required for 1 kW output. But as each cosmic ray can create hundreds of muons and each muon can catalyze about 100 reactions, the available cosmic ray flux in interplanetary space (known to be several orders of magnitude greater than on Earth) is believed to be sufficient for this purpose following research, development, and engineering efforts.

Accordingly, as seen in FIG. 4, one possible landing technique is to project micro-fusion target material, e.g. dispersed from projectiles shot downward from the landing spacecraft 51. The projectiles chemically explode to create a cloud 59A of micro-fusion target fuel material that can interact with incoming cosmic rays 50 (and muons p generated by interaction of the cosmic rays 50 with the planetary or lunar atmosphere and dust or with dust in the micro-fusion fuel clouds 59A and 59B). Micro-fusion products (primarily fast alpha particles a) then provide braking thrust against the landing craft 51. The fusion events would typically be contained in a sufficiently localized cloud 59A that the fusion products will push directly against the landing craft 51 itself. The landing or braking function need only rely on a modest retro-thrust if applied over a relatively long period of time (hours or longer) rather than in short bursts (minutes or seconds) to bring the spacecraft in gradually to a surface landing.

An automated landing system (providing for human intervention only as a backup or for emergencies) can be based upon the micro-fusion for achieving a safe landing. As seen, the landing system has been pre-positioned at one or more desired landing sites on the surface of the planet or space body. The landing system would include a radar subsystem 53 to track the arriving craft 51, precisely measuring its altitude, velocity, trajectory, and rate of change of these parameters. Using those measurements, the landing system could then launch a sequence of micro-fusion fuel packages 56 from a gun 55A near the designated landing site 52. The shell projectile packages 56 are delivered along a trajectory 58 to specified locations directly in the craft's incoming flight path 57, then the projectile's contents are dispersed as a cloud 59A of micro-fusion target material to interact with incoming cosmic rays and muons to generate energetic fusion products that produce the desired braking thrust upon the craft 51 as it approaches the landing site 52.

Each landing site 52 would have a radar system 53 that emits directed radio energy 54 toward the incoming craft 51 and receive the reflected radio signal so as to determine altitude, trajectory, velocity, rate of change and other parameters needed to deliver micro-fusion fuel packages 56 to locations that will get the craft 51 safely to its landing site 52. The packages 56 and the micro-fusion fuel cloud 59A they release provide the needed retro-thrust or braking cushion to the craft 51. Additionally, the immediate landing site 52 may directly release a cloud 59B of the micro-fusion material, e.g. via a spray system 55B, to create a retro-thrust landing cushion. The software program and its associated radar tracking equipment 53 and the gun (or guns) 55A directing the projectiles 56, along with the micro-fusion cloud spray system 55B for the landing site 52, together form an automated landing system that can have AI (e.g. self-learning) features, whereby each landing of a craft 51 is evaluated according to specified benchmarks, and then adjusted for subsequent landings to deliver more accurately the shell projectiles 56 that create the micro-fusion braking cushion. For example, the system may have the benefit of cosmic ray or muon flux measurements and local atmospheric conditions during a landing sequence and need to adjust the rate projectile firing to compensate for any change in these conditions.

Spacecraft that would be arriving at a planet, moon or other space body will decelerate in a braking phase to obtain orbit in preparation for landing. Landing sites will have been selected and have the automated landing systems set up in advance at each of them. The spacecraft may receive telemetry data from the landing systems of one or more landing sites so that its own flight parameters can be confirmed before beginning a landing sequence. Once a landing site is selected (and preferably a suitable back-up landing site as well), the spacecraft would use its own propulsion system to set up its initial trajectory for the landing. This could include, for example, an onboard ion propulsion system to steer the craft as needed. At the proper time, the two landing sites would turn on their micro-fusion landing cushions and confirm that they are working. When the craft comes in for a landing toward the primary landing site, if anything negative occurs, the craft, depending on its altitude, could instead launch its own micro-fusion cushion system, head for the backup landing site, or abort the landing and re-accelerate back into orbit.

Figure 5:
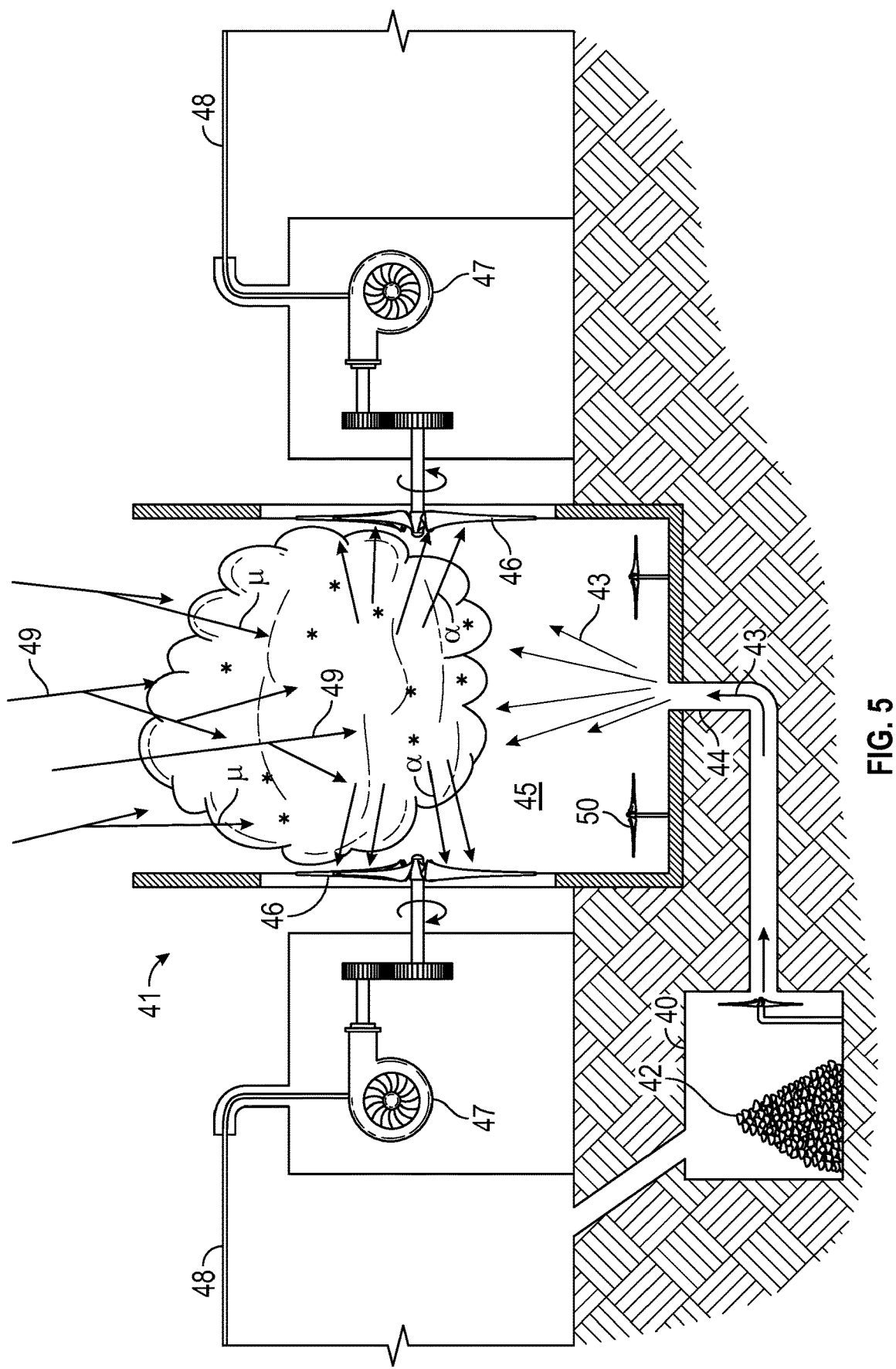
FIG. 5 is a schematic plan view of a micro-fusion-driven turbine generator apparatus in accord with the present invention, shown operating on a lunar or planetary surface to supply electrical power.

With reference to FIG. 5, the base will need electric power for all of its operational needs, including heating and cooling, lighting, communications, life support, and the like. A minimum baseline power output (e.g. 40 KW) will be needed. Some of that power might be supplied with solar photoelectric power. However, solar requires storage for nighttime. Additionally, periodic dust storms reduce power outputs for extended times. One could beam power from orbit to a rectifying antenna receiver. This invention also sees the possibility of employing micro-fusion electric generation as a primary or supplemental power source. For example, each module might have two or more micro-fusion electric generators located at a safe distance outside the craft and connected to it by electrical cables. Cosmic ray flux naturally present in interstellar space is used to power nuclear micro-fusion events (via particle-target micro-fusion and muon-catalyzed micro-fusion) that will generate electrical energy for the mining activity.

In the embodiment shown in FIG. 5, each micro-fusion engine may have one or more turbine electric generators 41, where the turbines are driven by the fast helium nuclei micro-fusion products generated from dispersed lithium-6 deuteride or other deuterium-containing micro-fusion target material exposed to the cosmic rays. Micro-fusion fuel packages would be delivered to the vicinity of each of the turbines, where the micro-fusion reaction products can turn the turbines to generate electricity for asteroid mining, including powering of mining equipment and powering of ion thrusters to move or redirect asteroids with mining potential. For example, in one embodiment a cloud of deuterium-containing micro-fusion target fuel 43, e.g. particles of Li$^6$D, is dispersed from a flue 44 into a volume 45 between two or more helium-wind turbines 46. Specifically, a generator assembly 41 includes a source 40 of deuterium-containing micro-fusion particle fuel material 42. This material could be blown 43 through a flue 44 (e.g. by means of a fan with a gas source at the source 40 or by other means depending on the form that the fuel material takes), and then dispersed from the flue 44 into a reaction volume 45. The micro-fusion target fuel material 43 is dispersed in proximity to turbines 46 arranged around the reaction volume 45, and then exposed to ambient cosmic rays 49 and muons p that enters the volume 45 and interacts with the dispersed fuel material 43 to cause nuclear micro-fusion events. High-energy cosmic rays 49 entering the volume 45 interact with the micro-fusion target fuel material 43 to cause nuclear fusion events. Fusion products, mainly high energy helium nuclei (alpha particles), direct kinetic energy to the turbine blades 46 to turn the turbines and generate electricity. A "wind" of micro-fusion products made up of energetic helium (alpha products) impinge upon and direct kinetic energy to the turbine blades 46 to turn the turbines and drive the associated generators 47 to produce electricity which can then be supplied via electric cables 48 to the habitats and other equipment. A set of one or more fans 50 in the reaction volume 45 may help keep the fuel material in suspension near the turbines 46.

The micro-fusion electrical generator system works in the presence of an ambient flux of cosmic rays and/or muons which interact with the cloud and trigger the nuclear micro-fusion of the particle target material, either by particle-target micro-fusion or muon-catalyzed micro-fusion or both. The micro-fusion fuel releases as a cloud and can be solid $Li^6D$ in powder form, D-D or D-T inertial-confinement-fusion-type pellets, $D_2O$ ice crystals, or droplets of (initially liquid) $D_2$.

The deuterium "fuel" for a generator may be supplied in the form of clouds of solid lithium-6 deuteride powder, pellets or chips, or even frozen heavy water ($D_2O$) or liquid droplets of $D_2$, to a reaction chamber 45, where it is exposed to incoming cosmic rays 49 and muons p, as seen in FIG. 5. One technique for creating the cloud of fusion target material is to shoot "fuel" packages as a series of projectiles into the reaction chamber, which can then disperse the fusion material as a localized cloud, much like fireworks or artillery. For this purpose, one or more gun tubes may be located below the chamber and loaded with the packages for introduction into the chamber. Alternatively, packages may be "dropped" into the chamber from near the top via a slide dispenser. The fuel within the projectile packages can be solid Li6D in powder form, D-D or D-T inertial-confinement-fusion-type pellets, or $D_2O$ ice crystals. To assist muon formation, especially when $D_2O$ is used, the target package may contain up to 20% by weight of added particles of fine sand or dust. Packages will be shielded, at least within the casing of the projectiles themselves, to reduce or eliminate premature fusion events until delivered and dispersed as a cloud in the reaction chamber. Soon after the projectile has reached the desired dispersal location within the chamber, the package releases its target material. For example, a chemical explosion can be used to locally disperse the fusion material. For a typical cloud of $Li^6D$ in powder form it may be desired to disperse the material near the top of the chamber to allow maximum usage of the material while it settles toward the bottom of the chamber. In the case of very large asteroids, it might be advantageous to provide one or more fans 50 at the bottom of the chamber 45 (seen in FIG. 5) to keep the cloud of target material suspended in the chamber as long as possible, but most asteroids will have sufficiently low, even negligible, gravity so that the micro-fusion fuel material settling too rapidly would not be a concern.

The dispersed cloud of target material will be exposed to both cosmic rays and to their generated muons. To assist in the formation of muons for muon-catalyzed fusion, especially when $D_2O$ or $D_2$ is used, the target package may contain up to 20% by weight of added particles of fine sand or dust. As cosmic rays collide with both micro-fusion target material and dust, they form muons that are captured by the deuterium and that catalyze micro-fusion. Likewise, the cosmic ray collisions themselves can directly trigger particle-target micro-fusion. Fusion products having significant kinetic energy (e.g. alpha particles) are generated and are received by turbines.

Besides D-D micro-fusion reactions, other types of micro-fusion reactions may also occur (e.g. D-T, using tritium generated by cosmic rays impacting the lithium-6; as well as $Li^6$-D reactions from direct cosmic ray collisions). For this latter reaction, it should be noted that naturally occurring lithium can have an isotopic composition ranging anywhere from as little as 1.899% to about 7.794% $Li^6$, with most samples falling around 7.4% to 7.6% $Li^6$. Although LiD that has been made from natural lithium sources could also be used, fuel material that has been enriched with greater proportions of $Li^6$ is preferable for achieving greater efficiency.

Stored fuel packages associated with the attached generator will be shielded to reduce or eliminate premature fusion events until delivered and dispersed as a cloud in the chamber. Some small amount of metal for fuel storage unit could be used for shielding, if needed. (For example, the Juno spacecraft to Jupiter contains radiation vaults of 1 cm thick titanium to shield its electronics from external radiation. A similar type of vault might be used in this case for the shielding of the stored fuel.) Alternatively, another possible source of such shielding might include the astronaut-miners' own water supply (if part of a manned mission), which should be adequate for the task. One need not eliminate cosmic rays or their secondary particles (pions, muons, etc.) to zero, but merely reduce their numbers and energies sufficiently to keep them from catalyzing sufficiently large numbers of fusion events in the stored target particle material.

The rate of fuel usage will depend on the amount of electricity required, the amount of fusion obtained from the ambient cosmic ray and/or muon flux, the dispersal rate of the fuel cloud from the chamber and the efficiency of the transfer of the fusion products into turbine rotation. Assuming most of the energy can be captured, an estimated $10^{15}$ individual micro-fusion reactions (less than 1 μg of fuel consumed) per second would be required for 1 kW output. But as each cosmic ray can create hundreds of muons and each muon can catalyze 100 micro-fusion reactions, the available cosmic ray flux in interplanetary space is believed to be sufficient for this purpose following research, development, and engineering efforts. For providing electrical power at a base, the number of generators per module and total number of generator units would need to be determined based upon the electrical power needs of the base and the power output per unit. Of course, any micro-fusion reactor will generally be located at a safe distance from crew quarters, for example as an unconnected module well away from the base and connected to the base and its various modules via power cables 48.

Figure 6:
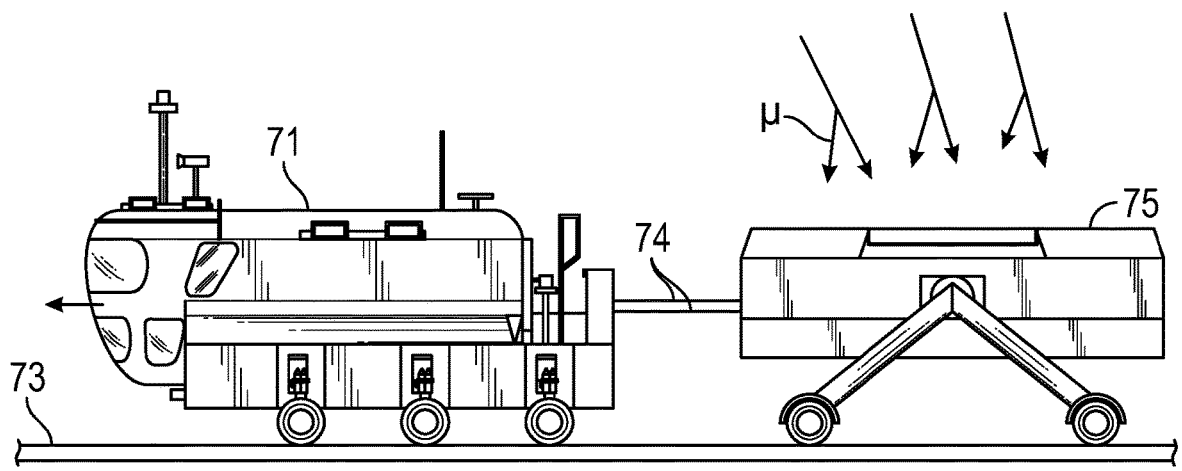
FIG. 6 is a local track-based vehicle and trailer with cosmic-ray/muon-catalyzed micro-fusion propulsion or electrical generation, illustrating one method of moving on a lunar or planetary surface.

With reference to FIG. 6, the same cosmic-ray/muon micro-fusion propulsion and braking system could be used for certain frequent short trips to and from bases by land vehicles 71, including those riding on rails, tracks or guides 73, i.e. atomic "trolley" cars. Such trolley cars 71 may be equipped with a muon-based micro-fusion electrical generator or thruster on the roof of the vehicle (with adequate shielding) or in a separate trailer 75 riding on the same track 73 and connected by cable 74 some distance behind the trolley 71. A similar method may be used to power surface transport of spacecraft after they've landed into a position that would allow docking to existing modules of the base.

Figure 7:
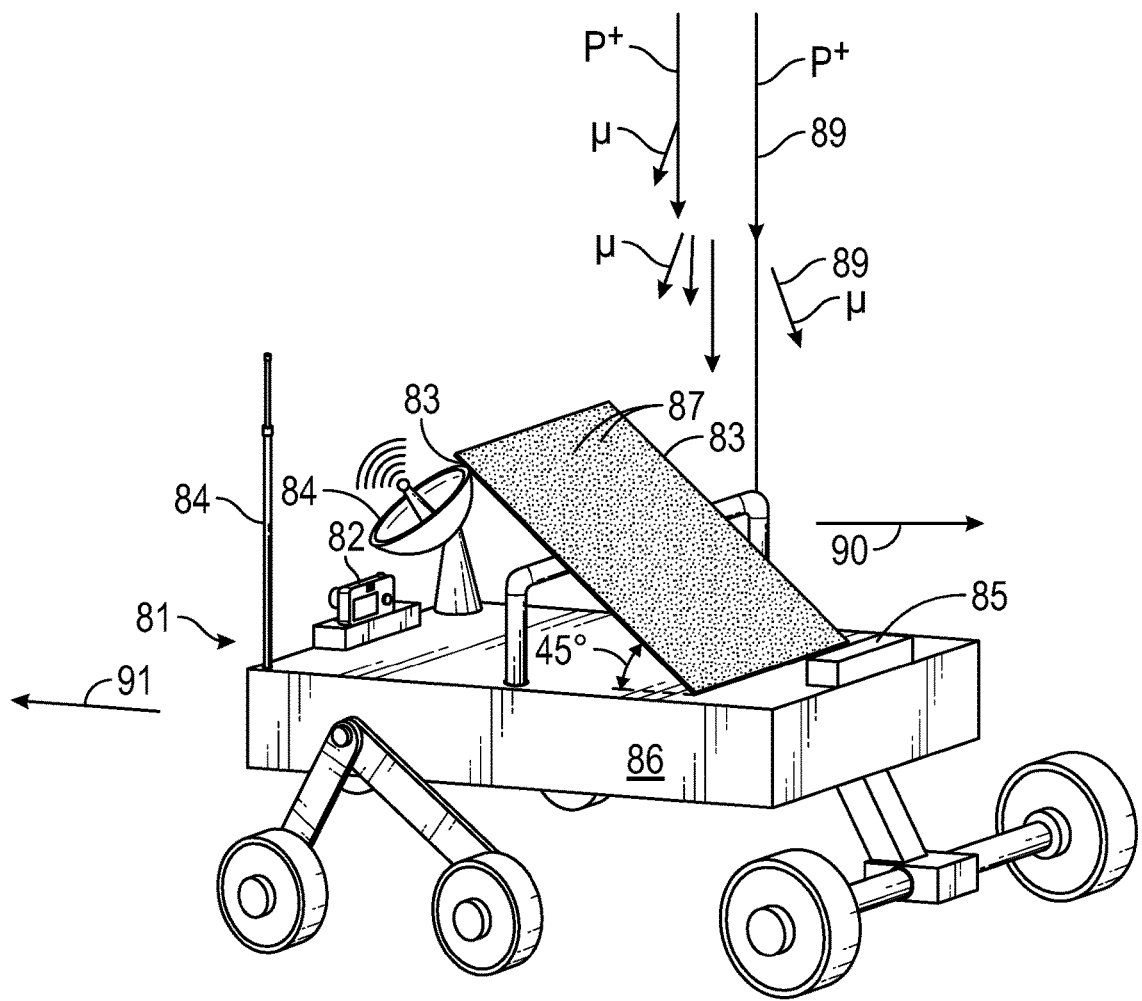
FIG. 7 is a perspective view of a transport vehicle equipped with a coated panel serving as a propulsion unit.
Figure 8:
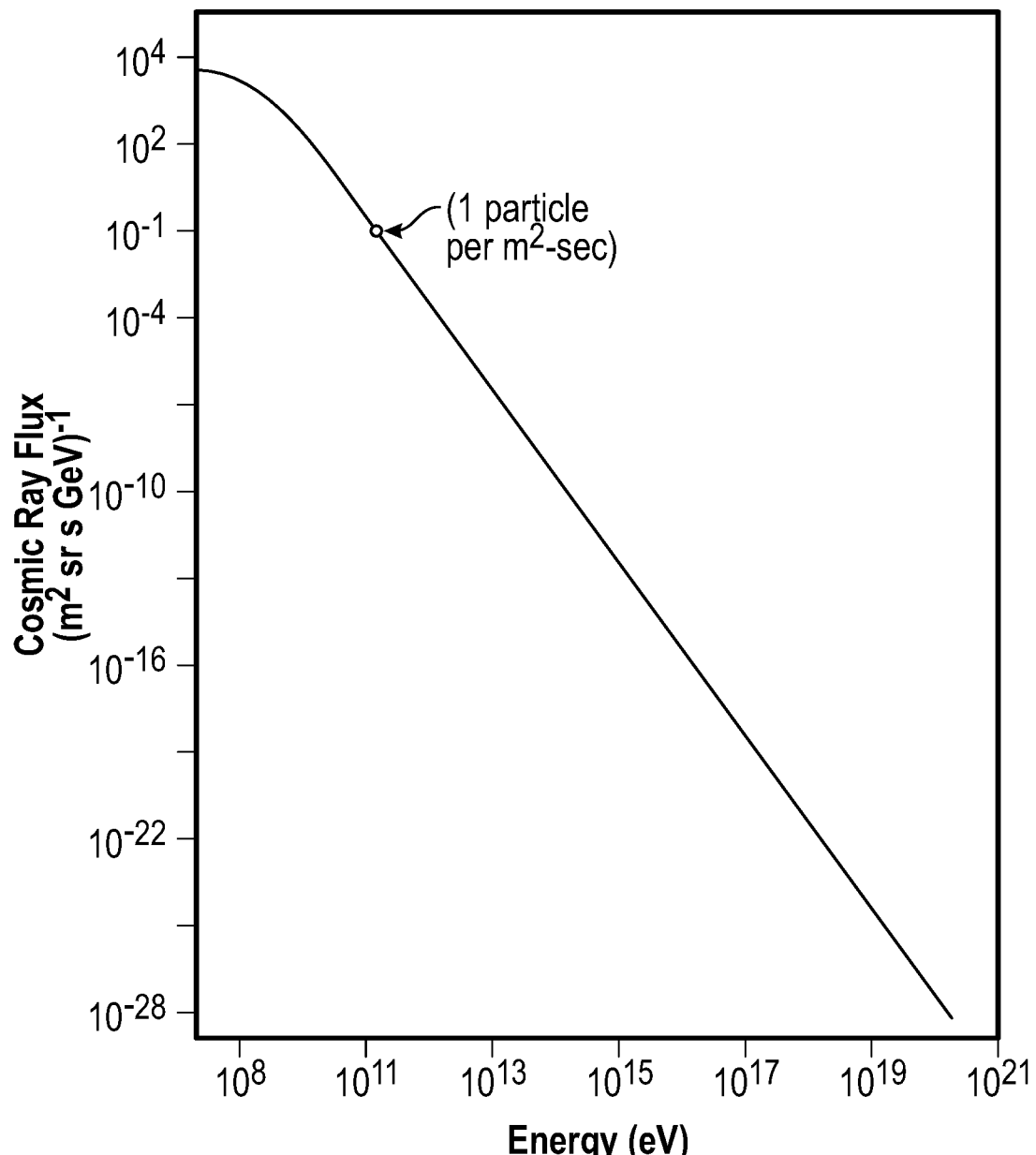
FIG. 8 is a graph of cosmic ray flux at the Earth surface versus cosmic ray energy, after very significant cosmic ray absorption by Earth's atmosphere has occurred.

With reference to FIG. 7, if the reaction rate can be optimized, the series of controlled micro-fusion reactions could be used to directly propel wheels or pistons to achieve physical motion, where a surface to be propelled by the micro-fusion reaction products is coated with the fusion fuel material and exposed to cosmic rays and the cosmic-ray-generated muons. For example, as seen in FIG. 7, a transport vehicle 81 (such as one similar to existing Martian rovers) has one or more fusion panels 83 attached to it. The transport vehicle 81 would normally have other equipment attached to it, such as cameras 82, antennae 84, instrument packages 85, and an electronics box 86. In whatever way the vehicle is equipped, the fusion panel(s) 83 has fusion fuel pellets or chips 87 (e.g. of $Li^6D$ or encapsulated $D_2O$) adhered or otherwise mounted to an upper surface of the panel 83. Cosmic rays (and generated muons) 89 arrive vertically and interact with the fuel chip material 87, producing energetic reaction products 90. For direct propulsion, the panel may be oriented at 45° to produce maximum horizontal drive force from the fusion products 90 for vehicle motion 91. Alternatively, for conversion of fusion heat into electrical power to drive a motor, panels would best be oriented horizontally.

What is claimed is:

1. A method of establishing and growing a lunar or planetary surface base making use of the presence of ambient flux of cosmic rays, comprising:
    landing a first spacecraft at a specified site on a lunar or planetary surface, the first spacecraft doubling as a first module of the lunar or planetary surface base;
    landing a second spacecraft at the specified site at a safe distance nearby the first module;
    moving the second spacecraft over the lunar or planetary surface into a side-by-side position relative to the first module, then docking the second spacecraft to the first module, the second spacecraft doubling as a second module of the lunar or planetary surface base; and
    landing third and subsequent spacecraft at the specified site at a safe distance nearby the surface base, each spacecraft doubling as a module of the surface base when moved into side-by-side position and docked with at least one existing module of the surface base;
    wherein at least one of the landings and movings of the spacecrafts and operation of the surface modules being powered by interaction of the ambient flux of cosmic rays and muons generated from the cosmic rays with a localized cloud of deuterium-containing particle fuel material exposed to the cosmic rays and muons to produce energetic reaction products.

2. The method as in claim 1, wherein landings of the spacecrafts are facilitated by projecting deuterium-containing particle fuel material as a localized cloud ahead of a direction of travel of the craft, the material interacting with the ambient flux of cosmic rays and muons to generate reaction products having kinetic energy, at least some of the reaction products being received by and pushing against the spacecraft in amounts sufficient to produce retro-thrust that decelerates the craft as it approaches the specified site.

3. The method as in claim 1, wherein landings of the spacecrafts are facilitated by spraying deuterium-containing particle fuel material as a localized cloud immediately above a landing site, the particle fuel material interacting with the ambient flux of cosmic rays and muons to generate reaction products having kinetic energy, at least some of the reaction products being received by and pushing against approaching spacecraft in amounts sufficient to produce retro-thrust that decelerates and cushions the craft as it approaches a landing at the specified site.

4. The method as in claim 1, wherein landings of at least some spacecrafts being in an upright orientation.

5. The method as in claim 4, wherein movings of the spacecrafts over the lunar or planetary surface also involving turning spacecrafts from an upright to a reclining horizontal orientation for use as base modules.

6. The method as in claim 1, wherein landings of at least some spacecrafts being upon landing wheels in a horizontal orientation.

7. The method as in claim 1, wherein movings of the spacecrafts over the lunar or planetary surface being facilitated by a panel mounted on the spacecrafts with a coating of deuterium-containing chips disposed on an upper surface of the panel, the chips producing energetic reaction products when exposed to and interacting with the ambient flux of cosmic rays and muons, wherein the panel is deployed so as to be oriented on the spacecraft at a selected angle relative to horizontal such that the energetic reaction products provide a horizontal drive force or thrust to laterally transport the spacecraft to a side-by-side position with a module of the surface base.

8. The method as in claim 1, wherein electrical power for the surface base is powered at least in part by a micro-fusion-driven turbine generator comprising a source of deuterium-containing micro-fusion particle fuel material, a reaction volume directed upwards from the lunar or planetary surface, a flue coupled to the source and reaction volume for dispersing fuel material into the reaction volume as a localized cloud that react with incoming cosmic rays and muons to produce energetic reaction products; a set of turbines arranged around the reaction volume to receive and be driven by the energetic reaction products; and a set of electrical generators coupled to the respective turbines to convert mechanical motion of the driven turbines into electricity, one or more electrical power lines from the generators being coupled to modules of the surface base.

9. The method as in claim 8, wherein electrical power lines from the generators are also coupled to landed spacecrafts to power lateral surface transport into a docking position with a module of the surface base.

10. The method as in claim 9, wherein at least two generators are coupled by electrical cables to each module of the surface base.

11. The method as in claim 1, wherein at least some modules are in a horizontal orientation and serve as two-story greenhouses with artificial solar lighting therein.

12. The method as in claim 11, wherein artificial solar lighting for the greenhouses is powered by micro-fusion electric generators driven by energetic reaction products from deuterium-containing micro-fusion particle fuel material reacting with ambient cosmic rays and muons.

13. The method as in claim 1, wherein the deuterium-containing particle fuel material comprises $Li^6D$.

14. The method as in claim 1, wherein the deuterium-containing particle fuel material comprises $D_2O$.

15. The method as in claim 1, wherein the deuterium-containing particle fuel material comprises $D_2$.

16. The method as in claim 1, wherein the deuterium-containing particle fuel material is in solid powder form.

17. The method as in claim 1, wherein the deuterium-containing particle fuel material is in solid chip or pellet form.

18. The method as in claim 1, wherein the deuterium-containing particle fuel material is in frozen form.

19. The method as in claim 1, wherein the deuterium-containing particle fuel material is in liquid droplet form.

20. The method as in claim 1, wherein the deuterium-containing particle fuel material also contains up to 20% by weight of added particles of fine sand or dust.

21. A lunar or planetary surface base making use of the presence of ambient flux of cosmic rays, comprising:

first module of the lunar or planetary surface base formed from repurposed spacecraft landed upon a lunar or planetary surface;

a second module of the lunar or planetary surface base formed from a second repurposed spacecraft landed upon the lunar or planetary surface and moved into a side-by-side position relative to the first module, the second module docked with the first module;

third and subsequent modules of the lunar or planetary surface base formed from repurposed additional spacecraft landed upon the surface a safe distance nearby the surface base then moved into side-by-side position and docked with at least one existing module of the surface base; and a set of micro-fusion-driven turbine electricity generators, each generator comprising a source of deuterium-containing micro-fusion particle fuel material, a reaction volume directed upwards from the lunar or planetary surface, a flue coupled to the source and reaction volume for dispersing fuel material into the reaction volume as a localized cloud that reacts with incoming cosmic rays and muons to produce energetic reaction products, a set of turbines arranged around the reaction volume to receive and be driven by the energetic reaction products, a set of electrical generators coupled to the respective turbines to convert mechanical motion of the driven turbines into electricity, and one or more electrical power lines from the generators coupled to modules of the surface base, whereby operation of the surface modules are powered at least in part by interaction of the ambient flux of cosmic rays and muons generated from the cosmic rays with a localized cloud of deuterium-containing particle fuel material exposed to the cosmic rays and muons to produce energetic reaction products.

\* \* \* \* \*